(12) United States Patent
Yuan et al.

(10) Patent No.: US 8,848,400 B2
(45) Date of Patent: Sep. 30, 2014

(54) SYSTEM AND METHOD FOR REACTIVE POWER REGULATION

(75) Inventors: Xiaoming Yuan, Hubei (CN); Zhuohui Tan, Shanghai (CN); Anthony Michael Klodowski, Hardy, VA (US)

(73) Assignee: General Electric Company, Schenectady, NY (US)

( * ) Notice: Subject to any disclaimer, the term of this patent is extended or adjusted under 35 U.S.C. 154(b) by 46 days.

(21) Appl. No.: 13/397,055

(22) Filed: Feb. 15, 2012

(65) Prior Publication Data
US 2013/0207622 A1 Aug. 15, 2013

(51) Int. Cl.
*H02J 3/36* (2006.01)

(52) U.S. Cl.
USPC ............................................. 363/35; 323/207

(58) Field of Classification Search
CPC ....... H02M 5/458; H02M 5/4585; H02J 3/36; G05F 1/70; Y02B 70/126
USPC .................... 363/34, 35, 36, 37; 323/205, 207
See application file for complete search history.

(56) References Cited

U.S. PATENT DOCUMENTS

| | | | |
|---|---|---|---|
| 4,755,738 A | 7/1988 | Shimamura et al. | |
| 5,187,427 A | 2/1993 | Erdman | |
| 5,225,712 A | 7/1993 | Erdman | |
| 5,287,288 A | 2/1994 | Brennen et al. | |
| 5,329,221 A | 7/1994 | Schauder | |
| 5,734,257 A | 3/1998 | Schauder | |
| 5,751,138 A | 5/1998 | Venkata et al. | |
| 5,883,796 A | 3/1999 | Cheng et al. | |
| 6,052,297 A | 4/2000 | Akamatsu et al. | |
| 6,052,299 A | 4/2000 | Schieke | |
| 6,056,782 A * | 5/2000 | Qi | 703/18 |
| 6,137,187 A | 10/2000 | Mikhail et al. | |
| 6,407,536 B1 * | 6/2002 | Ogusa | 323/207 |
| 7,095,131 B2 | 8/2006 | Mikhail et al. | |
| 7,095,597 B1 | 8/2006 | Cousineau | |
| 7,117,070 B2 * | 10/2006 | Chow et al. | 323/205 |

(Continued)

FOREIGN PATENT DOCUMENTS

| WO | WO 2010028689 A1 * | 3/2010 |
|---|---|---|
| WO | 2011/037537 A2 | 3/2011 |

OTHER PUBLICATIONS

Machine Definition, www.dictionary.com.*

(Continued)

*Primary Examiner* — Gary L Laxton
*Assistant Examiner* — Alex Torres-Rivera
(74) *Attorney, Agent, or Firm* — Global Patent Operation; Douglas D. Zhang

(57) ABSTRACT

A system and method are provided for performing reactive power control. The system includes a power converter and a controller coupled to the power converter. The power converter is configured to convert a first form of electric power generated from the power source to a second form of electric power suitable to be distributed by the electrical grid. The controller is configured to monitor the electric power transmitted between the power converter and the electrical grid. The controller is further configured to decouple a positive sequence component and a negative sequence component from the monitored electric power. The controller is further configured to perform a positive reactive power control and a negative reactive power control with respect to the decoupled positive and negative sequence components. The controller is further configured to transmit a control signal to the power converter based on the positive and negative reactive power control.

20 Claims, 12 Drawing Sheets

(56) References Cited

U.S. PATENT DOCUMENTS

| | | | |
|---|---|---|---|
| 7,312,537 B1 | 12/2007 | Walling | |
| 7,321,500 B2* | 1/2008 | Asplund et al. | 363/35 |
| 7,391,126 B2 | 6/2008 | Liu et al. | |
| 7,423,412 B2 | 9/2008 | Weng et al. | |
| 7,446,435 B2 | 11/2008 | Zhang et al. | |
| 7,456,695 B2 | 11/2008 | Weng et al. | |
| 7,508,173 B2 | 3/2009 | Zhou et al. | |
| 7,521,887 B2* | 4/2009 | Tobari et al. | 318/717 |
| 7,532,490 B2 | 5/2009 | Datta et al. | |
| 7,605,487 B2 | 10/2009 | Barton et al. | |
| 7,629,705 B2 | 12/2009 | Barker et al. | |
| 2004/0085046 A1 | 5/2004 | Ye et al. | |
| 2005/0040655 A1 | 2/2005 | Wilkins et al. | |
| 2005/0073284 A1 | 4/2005 | Sivasubramaniam et al. | |
| 2005/0207190 A1 | 9/2005 | Gritter | |
| 2006/0227578 A1 | 10/2006 | Datta et al. | |
| 2007/0024059 A1 | 2/2007 | D'Atre et al. | |
| 2007/0159265 A1 | 7/2007 | Weng et al. | |
| 2008/0093853 A1 | 4/2008 | Barker et al. | |
| 2009/0003020 A1 | 1/2009 | Zhang et al. | |
| 2009/0085354 A1 | 4/2009 | Tan et al. | |
| 2009/0121483 A1 | 5/2009 | Xiong et al. | |
| 2009/0212564 A1 | 8/2009 | Yang et al. | |
| 2010/0002475 A1 | 1/2010 | Folts et al. | |
| 2010/0133831 A1 | 6/2010 | Scholte-Wassink et al. | |
| 2010/0134076 A1 | 6/2010 | Cardinal et al. | |
| 2011/0134669 A1* | 6/2011 | Yuzurihara et al. | 363/89 |
| 2013/0107586 A1* | 5/2013 | Klodowski et al. | 363/34 |

OTHER PUBLICATIONS

Vilcahuaman, R; Rudnick, H; Arias, J: "Volt/Var Control with Interactive Graphics Interface on Distribution Systems"; 11th ISPE/IEE/IFAC International Conference on CAD/CAM, Robotics and Factories of the Future Cars & FOF'95, Colombia, Aug. 28-30, 1995.

Wangsathitwong, S; Sirisumrannukul, S; S Chatratana S and Deleroi, W: "A Control Technique of Line Side Converter for Doubly Fed Induction Generators under Unbalanced Voltages Conditions". Australian Journal of Electrical & Electronics Engineering, vol. 6, No. 3, 2009: 319-328. 2009.

Fei Wang et al: "Pliant Active and Reactive Power Control for Grid-Interactive Converters Under Unbalanced Voltage Dips", IEEE Transactions on Power Electronics, 010 IEEE Service Center, Piscataway, NJ, US, vol. 26, No. 5, May 1, 2011, pp. 1511-1521, XPOI1382807, ISSN: 0885-8993, 001: 10.1109/TPEL.2010.2052289.

European Search Report issued in connection with EP Application No. 12152479.7, dated Jun. 29, 2012.

* cited by examiner

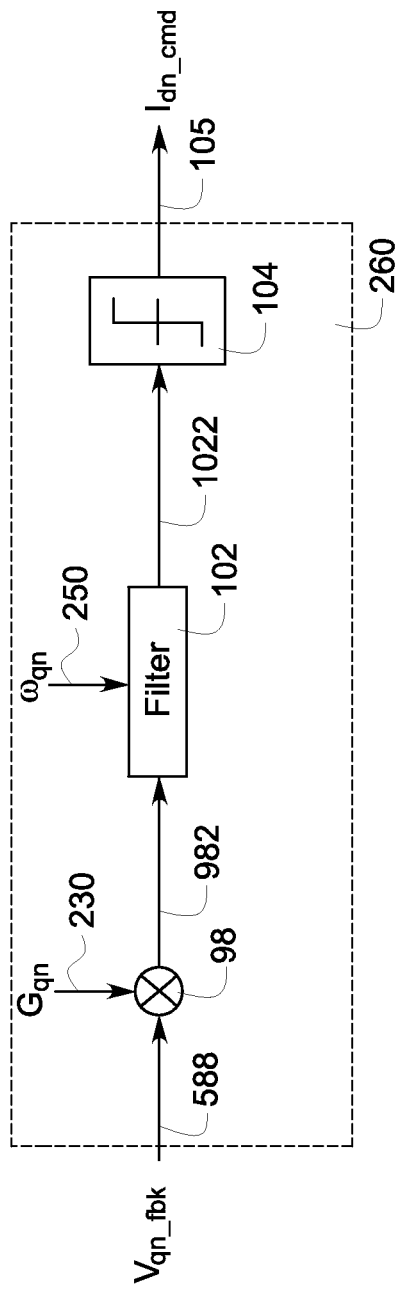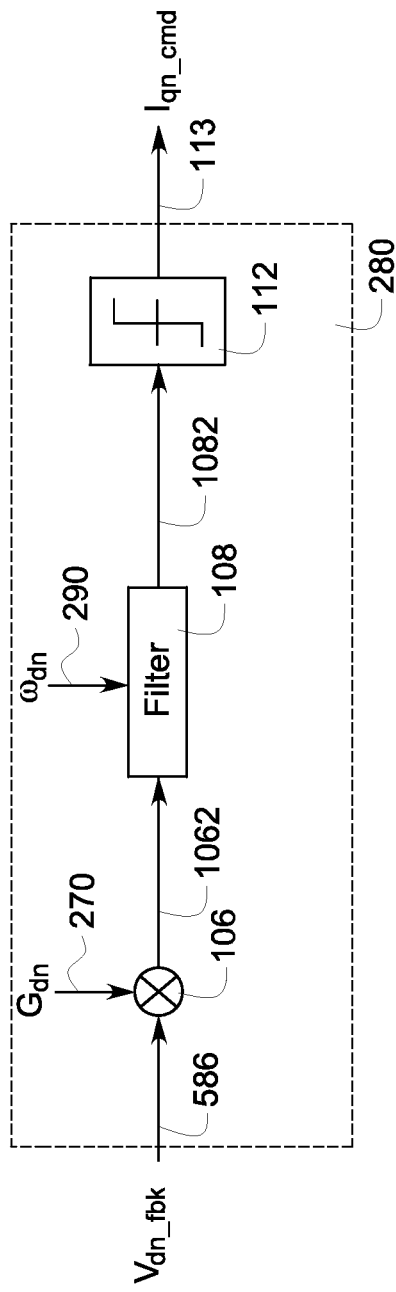

`US 8,848,400 B2`

SYSTEM AND METHOD FOR REACTIVE POWER REGULATION

BACKGROUND OF THE INVENTION

1. Field of the Invention

The field of the invention relates generally to power regulation, and more particularly relate to reactive power regulation.

2. Description of Related Art

Power sources such as solar panels and wind turbines have received increased attention as environmentally safe and sustainable alternative power sources compared to traditional coal powered power sources. When the power output from the power sources is fed to an electrical grid for transmission and distribution, it is usually necessary to control the reactive power of the output power to fulfill electrical demand while providing stability for the electrical grid.

Conventional reactive power control is based on the assumption that the electrical grid is always symmetrical in three phases. Based on this assumption, the reactive power is regulated by directly adjusting the output power in positive sequence components without considering negative sequence components in the electrical grid. However, in an imbalanced electrical grid, the negative sequence components may lead to second order ripples in the output power. Therefore, the reactive power control is not accurate due to the lack of reactive power regulation with respect to the negative sequence components.

In addition, many countries now require that power sources stay connected with the electrical grid when the electrical grid experiences fault conditions. However, providing accurate reactive power control may be even more challenging during fault conditions.

It is desirable to provide a system and method for regulating reactive power to address the above-mentioned problems.

BRIEF SUMMARY OF THE INVENTION

In accordance with one embodiment disclosed herein, a system is provided for performing reactive power control. The system includes a power converter and a controller coupled to the power converter. The power converter is coupled between a power source and an electrical grid. The power converter is configured to convert a first form of electric power generated from the power source to a second form of electric power suitable to be distributed by the electrical grid. The controller is configured to monitor the electric power transmitted between the power converter and the electrical grid. The controller is further configured to decouple a positive sequence component and a negative sequence component from the monitored electric power. The controller is further configured to perform a positive reactive power control with respect to the positive sequence component. The controller is further configured to perform a negative reactive power control with respect to the negative sequence component. The controller is further configured to transmit a control signal to the power converter based on the positive reactive power control and the negative reactive power control to enable the power converter to adjust a reactive power of the electric power transmitted between the power converter and the electrical grid.

In accordance with another embodiment disclosed herein, a method is provided for performing reactive power control with respect to electric power transmitted between a power source and an electrical grid. The method includes monitoring the electric power transmitted between the power source and the electrical grid. The method further includes decoupling a positive sequence component and a negative sequence component from the monitored electric power. The method further includes performing a positive reactive power control with respect to the positive sequence component. The method further includes performing a negative reactive power control with respect to the negative sequence component. The method further includes adjusting a reactive power of the electric power transmitted between the power source and the electrical grid based on the positive reactive power control and the negative reactive power control.

In accordance with another embodiment disclosed herein, a system is provided for performing reactive power control. The system includes a power converter and a controller. The power converter includes a machine-side converter and a grid-side converter. The machine-side converter is electrically coupled to a power source for converting alternating current (AC) electric power to direct current (DC) electric power. The grid-side converter is electrically coupled to an electrical grid for converting the DC electric power to AC electric power for use by the electrical grid. The controller is operatively coupled to the grid-side converter and is configured to monitor the AC electric power transmitted between the grid-side converter and the electrical grid. The controller is further configured to decouple a first sequence component and a second sequence component from the monitored AC electric power. The controller is further configured to perform a first reactive power control with respect to the first sequence component to generate a first command signal and to perform a second reactive power control with respect to the second sequence component to generate a second command signal. The controller is further configured to transmit a control signal to the grid-side converter in response to the first command signal and the second command signal to enable the grid-side converter to adjust a reactive power of the AC electric power transmitted between the grid-side converter and the electrical grid.

BRIEF DESCRIPTION OF THE SEVERAL VIEWS OF THE DRAWINGS

These and other features, aspects, and advantages of the present disclosure will become better understood when the following detailed description is read with reference to the accompanying drawings in which like characters represent like parts throughout the drawings, wherein:

FIG. 10 is a block diagram of a first negative regulation module of a negative power regulator shown in FIG. 2 in accordance with an exemplary embodiment;

FIG. 11 is a block diagram of a second negative regulation module of a negative power regulator shown in FIG. 2 in accordance with an exemplary embodiment;

DETAILED DESCRIPTION OF THE INVENTION

Embodiments disclosed herein relate to a system and method for reactive power regulation. In one aspect, the system and method are implemented by decoupling positive sequence components and negative sequence components of the system output power. The system and method are further implemented by separately regulating reactive power with respect to the positive sequence and the negative sequence for controlling the reactive power more accurately and thereby stabilizing the electrical grid and mitigating grid imbalance. As the positive reactive power and negative reactive power are independently regulated, the terms "vector VAR control" or "vector VAR regulation" are introduced herein. These terms are not intended to limit the scope of the disclosure of reactive power control only as, in some implementations, "vector VAR control" may also include active power control or active power regulation.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect.

Figure 1:
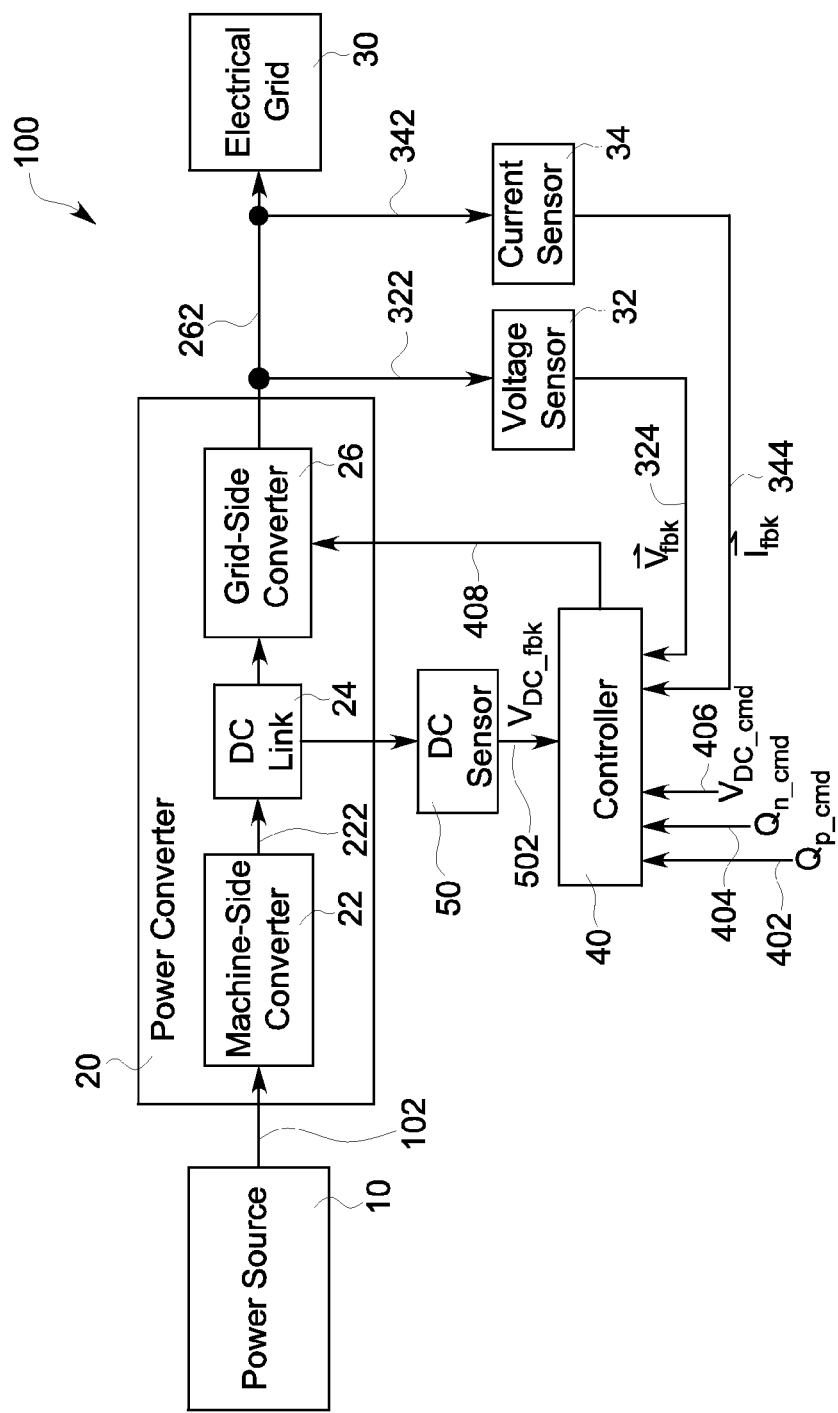
FIG. 1 is a block diagram of a system in accordance with an exemplary embodiment.

FIG. 1 illustrates a block diagram of a system 100 in accordance with an exemplary embodiment. In the illustrated embodiment of FIG. 1, the system 100 generally includes a power source 10, a power converter 20, an electrical grid 30, and a controller 40. Each block of the system 100 will be described in further detail below.

The power source 10 is configured to generate a first form of electric power 102 from a variety of available energy sources. In one implementation of the disclosure, the power source 10 may include an electrical machine such as a wind turbine or a marine hydrokinetic energy turbine. A wind turbine is operable to transform mechanical wind power to mechanical rotational power and to convert the mechanical rotational power to generate three-phase alternating current (AC) electric power. Marine turbines are operable to transform mechanical tidal power to generate three-phase AC electric power. It should be recognized the three-phase AC electric power is one type of the first form of electric power 102. In other embodiments, the first form of electric power may include poly-phase AC electric power or direct current (DC) electric power. In one implementation, the power source 10 may include a solar panel having a packaged assembly of solar cells. The solar panel is configured to generate DC electric power from the sun through photovoltaic effects.

The power converter 20 is coupled to the power source 10 for receiving the first form of electric power 102 from the power source 10. The power converter 20 is configured to convert the first form of electric power 102 to a second form of electric power 262. In one implementation of the disclosure wherein the power source 10 includes a wind turbine, the power converter 20 is designed to include a machine-side converter 22, a grid-side converter 26, and a direct current (DC) link 24 coupled between the machine-side converter 22 and the grid-side converter 26. The machine-side converter 22 acts as a rectifier and is configured to rectify the three-phase AC electric power 102 to DC electric power 222. The DC electric power 222 is transmitted to the DC link 24. The DC link 24 may include one or more capacitors coupled in series or in parallel. The DC link 24 is configured to mitigate voltage variations across the DC link 24 with AC rectification. The DC electric power 222 is subsequently transmitted from the DC link 24 to the grid-side converter 26. The grid-side converter 26 acts as an inverter, is configured to convert the DC electric power 222 from DC link 24 back to three-phase AC electric power 262, and is controlled by the controller 40. The three-phase AC electric power 262 is subsequently transmitted to the electrical grid 30 for transmission and distribution. In one embodiment, the machine-side converter 22 and the grid-side converter 26 may include a three-phase two-level topology with a series of semiconductor power switches fully controlled and regulated using a pulse width modulation (PWM) strategy. In alternative embodiments, the machine-side converter 22 and the grid-side converter 26 may include three-phase three-level topology. The semiconductor power switches may include any appropriate devices with several examples including insulated gate bipolar transistors (IGBTs), gate communicated thyristors (GCTs), and metal oxide semiconductor field effect transistors (MOSFETs). In embodiments wherein the power source 10 supplies DC power, the machine-side converter 22 may be omitted or may be configured as a DC to DC converter, for example.

In the illustrated embodiment of FIG. 1, the system 100 further includes a voltage sensor 32, a current sensor 34, and a DC voltage sensor 50. The voltage sensor 32 and the current sensor 34 are both electrically coupled to a joint connection between the grid-side converter 26 and the electrical grid 30. The voltage sensor 32 is configured to measure a system voltage 322 of the three-phase AC electric power 262 transmitted to the electrical grid 30, and in response thereto, to provide a feedback system voltage 324 to the controller 40. In one implementation, the system voltage 322 may include three line voltages from the transmissions line. In another implementation, the system voltage 322 may include line-toline voltages transmitted between two transmission lines. The current sensor 34 is configured to measure a system current 342 of the three-phase AC electric power 262, and in response thereto, to provide a feedback system current 344 to the controller 40. In one implementation, the system current 342 may include three currents flowing through the transmission lines. The DC voltage sensor 50 is configured to measure a DC voltage 222 across the DC link 24, and in response thereto, to provide a feedback DC voltage 502 to the controller 40.

The controller 40 operates in response to the feedback system voltage 324, the feedback system current 344, and feedback DC voltage 502 from DC sensor 50 and a variety of system commands to generate a control signal 408 for controlling the grid-side converter 26. The system commands may include a positive reactive power command 402, a negative reactive power command 404, and a DC voltage command 406. Although not a focus of this disclosure, controller 40 itself or an additional controller may be used to provide control signals for the machine-side converter 22. Further details of the controller 40 will be described below.

Figure 2:
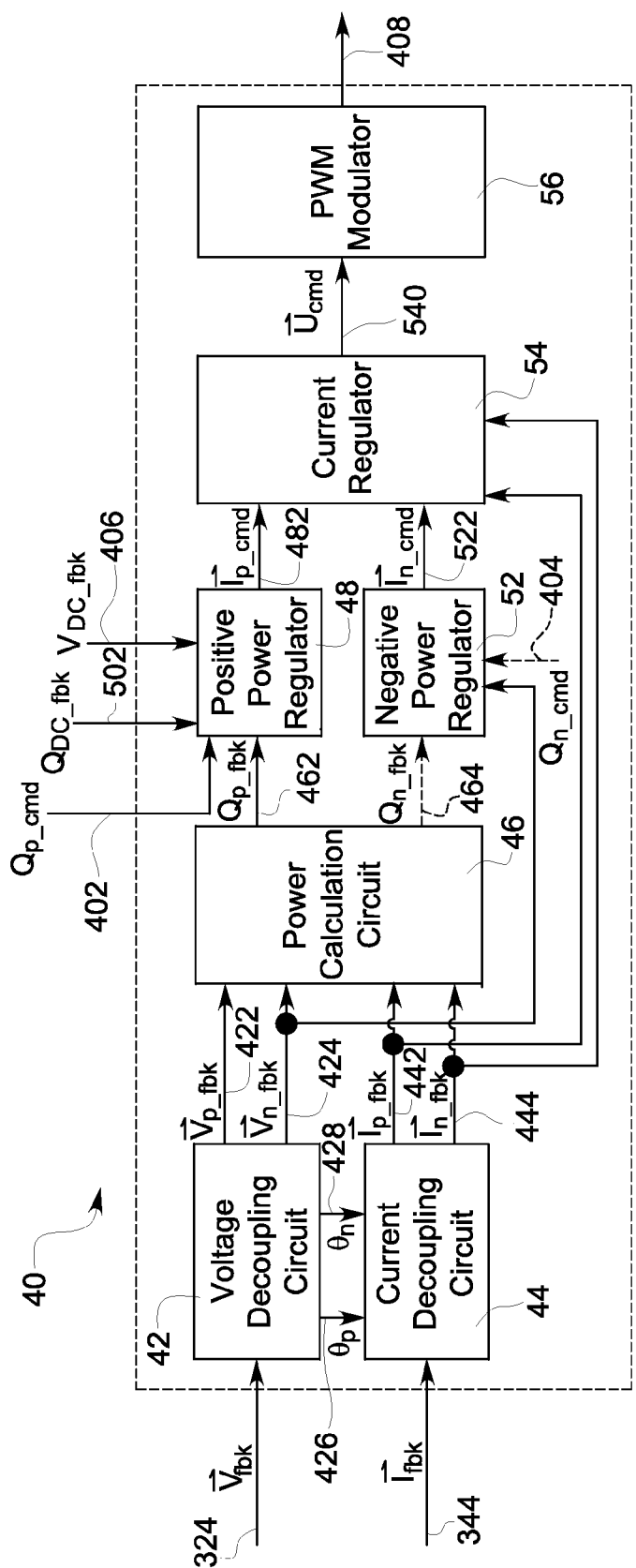
FIG. 2 is a block diagram of one embodiment of a controller for use in the embodiment of in FIG. 1.

FIG. 2 illustrates a block diagram of the controller 40 shown in FIG. 1 in accordance with an exemplary embodiment. As illustrated in FIG. 2, the controller 40 includes a voltage decoupling circuit 42, a current decoupling circuit 44, a power calculation circuit 46, a positive power regulator 48, a negative power regulator 52, a current regulator 54, and a PWM modulator 56.

Figure 3:
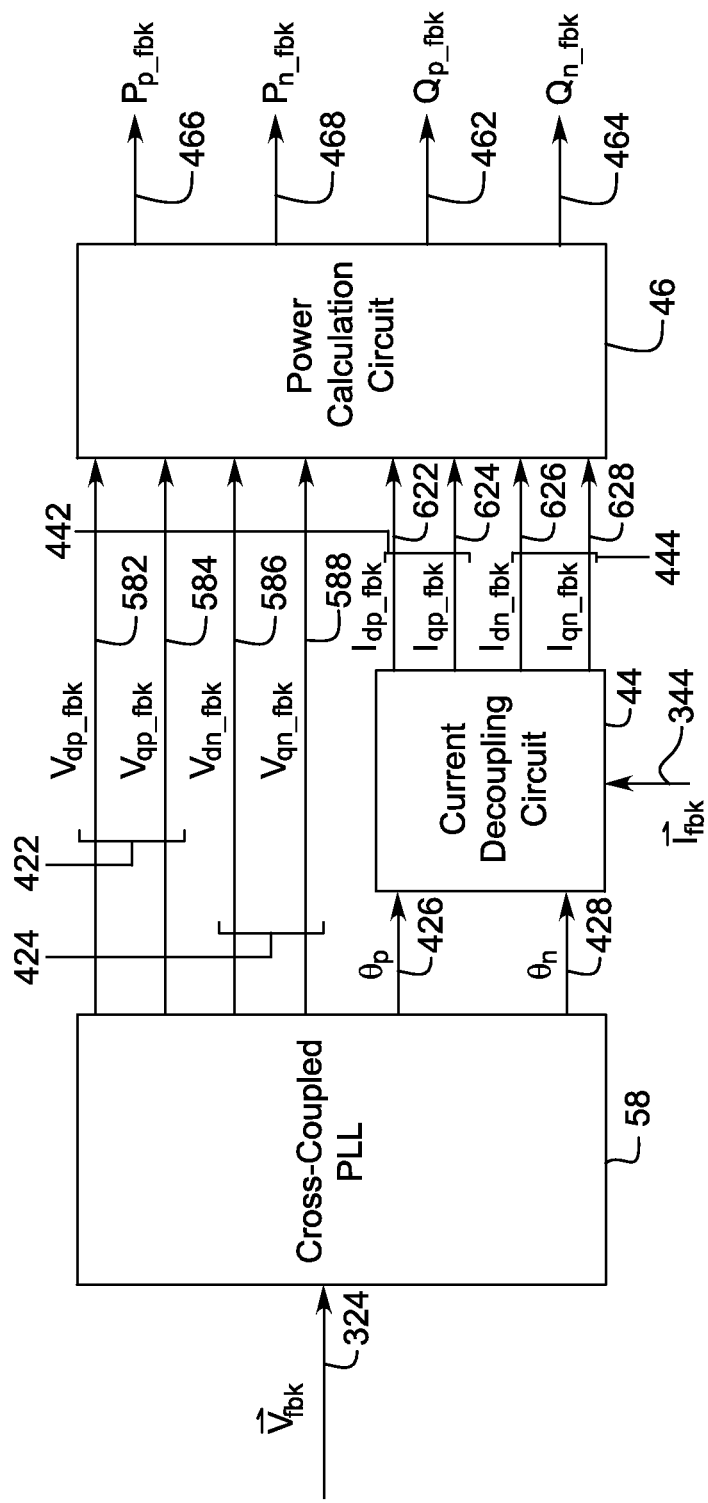
FIG. 3 is a block diagram illustrating several circuits of the controller shown in FIG. 2 in accordance with an exemplary embodiment.

As illustrated in FIG. 2, the voltage decoupling circuit 42 is coupled to the voltage sensor 32 (FIG. 1) to receive the feedback system voltage 324 from the voltage sensor 32. The voltage decoupling circuit 42 is configured to decouple positive and negative voltage components from the feedback system voltage 324. In one implementation of the disclosure, the voltage decoupling circuit 42 may include a crossed-coupled phase lock loop (CCPLL) circuit 58 as shown in FIG. 3. In a synchronously rotating two-phase direct and quadrature (d-q) reference frame, the feedback positive sequence voltage component 422 decoupled from the CCPLL circuit 58 includes a d-axis positive voltage 582 and a q-axis positive voltage 584. Similarly, the feedback negative sequence voltage 424 decoupled from the CCPLL circuit 58 includes a d-axis negative voltage 586 and a q-axis negative voltage 588. The CCPLL circuit 58 is also configured to provide a positive phase angle 426 and a negative phase angle 428. In one implementation, an example of a CCPLL circuit 58 can be found in commonly assigned Weng et al., U.S. Pat. No. 7,456,695, which is incorporated by reference herein.

As illustrated in FIG. 2, the current decoupling circuit 44 is coupled to the current sensor 34 (FIG. 1) to receive the feedback system current 344 from the current sensor 34. The current decoupling circuit 44 is configured to decouple positive and negative current components from the feedback system current 344 according to the positive and negative phase angles 426, 428 generated by the voltage decoupling circuit 42. In one implementation illustrated in FIG. 3, in the d-q reference frame, the feedback positive sequence current 442 decoupled from the current decoupling circuit 44 includes a d-axis positive current 622 and a q-axis positive current 624, and the feedback negative sequence current 444 decoupled from the current decoupling circuit 44 includes a d-axis negative current 626 and a q-axis negative current 628. Further details of the current decoupling circuit 44 will be described below.

As illustrated in FIG. 2, the power calculation circuit 46 is coupled both to the voltage decoupling circuit 42 and the current decoupling circuit 44 for receiving the decoupled positive and negative sequence voltage components and positive and negative sequence current components to perform power calculation. In one implementation of the disclosure, the power calculation circuit 46 receives the feedback positive and negative sequence voltages 422, 424 and the feedback positive and negative sequence currents 442, 444 for use in calculating a feedback positive reactive power 462 and a feedback negative reactive power 464. After the feedback positive and negative reactive powers 462, and 464 are calculated, the controller 40 may perform reactive power control based on the positive reactive power command 402 and the negative reactive power command 404. In another implementation, further referring to FIG. 3, the power calculation circuit 46 may be further configured to calculate a feedback positive active power 466 and a feedback negative active power 468 for facilitating performing active power control. Further details of calculating the feedback positive and negative reactive power will be described below.

As illustrated in FIG. 2, the positive power regulator 48 is coupled to the power calculation circuit 46. The positive power regulator 48 is configured to receive the feedback positive reactive power 462 and to perform a positive reactive power control according to the positive reactive power command 402. The positive power regulator 48 is further configured to receive the feedback DC voltage 502 and to perform a positive active power control according to the DC command 406. By performing the positive reactive and active power controls, the positive power regulator 48 provides a positive current command 482. Further details of performing the positive reactive power control will be described below.

As illustrated in FIG. 2, the negative power regulator 52 is configured to receive the feedback negative reactive power 464 and to perform a negative reactive power according to the negative reactive power command 404. By performing the negative reactive power control, the negative power regulator 52 provides a negative current command 522. Further details of performing the negative reactive power control will be described below.

As illustrated in FIG. 2, the current regulator 54 is coupled to the positive power regulator 48 and the negative power regulator 52 for receiving the positive current command 482 and the negative current command 522. The current regulator 54 may also be coupled to the current decoupling circuit 44 for receiving the feedback positive and negative sequence current 442, 444. In one implementation, the current regulator 54 processes the feedback positive and negative sequence current 442, 444 and the positive and negative current commands 482, 522 to provide a voltage command 540. The voltage command 540 is modulated in the PWM modulator 56 to provide the control signal 408. The control signal 408 is applied to the grid-side converter 26 (FIG. 1) for driving the grid-side converter 26 to generate desired current output. The control signal 408 may include pulse signals having on and off states.

Figure 4:
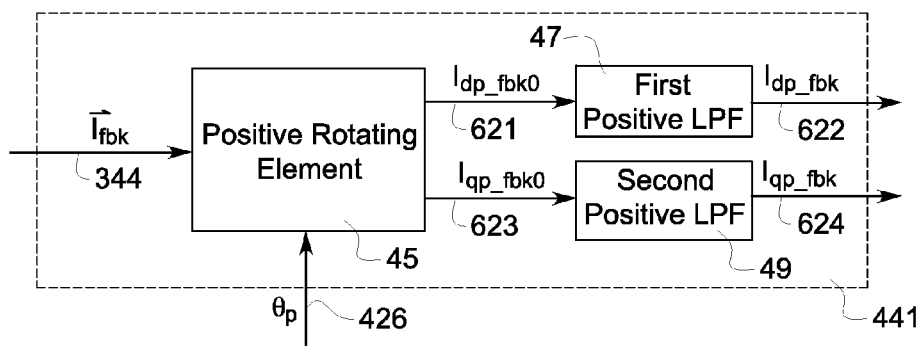
FIG. 4 is a block diagram of one embodiment of a positive current decoupling circuit of a current decoupling circuit for use in the embodiment in FIG. 3.

FIG. 4 illustrates a block diagram of one embodiment of a positive current decoupling circuit 441 of the current decoupling circuit 44 for use in the embodiment in FIG. 3. The positive current decoupling circuit 441 is configured to decouple positive sequence current components from the feedback system current 344. In one implementation, the positive current decoupling circuit 441 includes a positive rotating element 45, a first positive low pass filter (LPF) 47, and a second positive LPF 49. The positive rotating element 45 is coupled to the current sensor 34 (FIG. 1) to receive the feedback system current 344 from the current sensor 34. The positive rotating element 45 rotates the feedback system current 344 according to the positive phase angle 426 and outputs a d-axis positive current 621 and a q-axis positive current 623. In one implementation, the positive rotating element 45 may rotate the three phase feedback system current 344 to two phase positive feedback current in the d-q reference frame according to the following matrix equation:

$$\begin{bmatrix} I_{dp\_fbk0} \\ I_{qp\_fbk0} \end{bmatrix} = \begin{bmatrix} \frac{2}{3}\cos\theta_p & -\frac{1}{3}\cos\theta_p + \frac{\sqrt{3}}{3}\sin\theta_p & -\frac{1}{3}\cos\theta_p - \frac{\sqrt{3}}{3}\sin\theta_p \\ -\frac{2}{3}\sin\theta_p & \frac{1}{3}\sin\theta_p + \frac{\sqrt{3}}{3}\cos\theta_p & \frac{1}{3}\sin\theta_p - \frac{\sqrt{3}}{3}\cos\theta_p \end{bmatrix} \begin{bmatrix} I_{a\_fbk} \\ I_{b\_fbk} \\ I_{c\_fbk} \end{bmatrix}, \quad (1)$$

where $I_{dp\_fbk0}$, $I_{qp\_fbk0}$ are the d-axis positive current 621 and the q-axis positive current 623 respectively in the d-q reference frame, $\theta_p$ is the positive phase angle 426, and $I_{a\_fbk}$, $I_{b\_fbk}$, $I_{c\_fbk}$ are three phase current components of the feedback system current 344. The first positive LPF 47 removes high frequency components from the d-axis positive current 621 and outputs the d-axis positive current 622. The second positive LPF 49 removes high frequency components from the q-axis positive current 623 and outputs the q-axis positive current 624.

Figure 5:
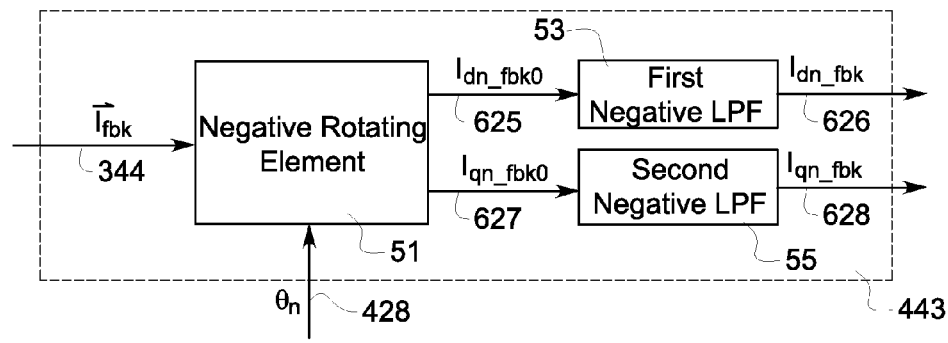
FIG. 5 is a block diagram of one embodiment of a negative current decoupling circuit of a current decoupling circuit for use in the embodiment in FIG. 3.

FIG. 5 illustrates a block diagram of one embodiment of a negative current decoupling circuit 443 of the current decoupling circuit 44 for use in the embodiment in FIG. 3. The negative current decoupling circuit 443 is configured to decouple negative sequence current components from the feedback system current 344. In one implementation, the negative current decoupling circuit 443 includes a negative rotating element 51, a first negative low pass filter (LPF) 53, and a second negative LPF 55. The negative rotating element 51 is coupled to the current sensor 34 (FIG. 1) to receive the feedback system current 344 from the current sensor 34. The negative rotating element 51 rotates the feedback system current 344 according to the negative phase angle 428 and outputs ad-axis negative current 625 and a q-axis negative current 627. In one implementation, the negative rotating element 51 may rotate the three phase feedback system current 344 to two phase negative feedback current in the d-q reference frame according to the following matrix equation:

$$\begin{bmatrix} I_{dn\_fbk0} \\ I_{qn\_fbk0} \end{bmatrix} = \begin{bmatrix} \frac{2}{3}\cos\theta_n & -\frac{1}{3}\cos\theta_n + \frac{\sqrt{3}}{3}\sin\theta_n & -\frac{1}{3}\cos\theta_n - \frac{\sqrt{3}}{3}\sin\theta_n \\ -\frac{2}{3}\sin\theta_n & \frac{1}{3}\sin\theta_n + \frac{\sqrt{3}}{3}\cos\theta_n & \frac{1}{3}\sin\theta_n - \frac{\sqrt{3}}{3}\cos\theta_n \end{bmatrix} \begin{bmatrix} I_{a\_fbk} \\ I_{b\_fbk} \\ I_{c\_fbk} \end{bmatrix}, \quad (2)$$

where $I_{dn\_fbk0}$, $I_{qn\_fbk0}$ are the d-axis negative current 625 and the q-axis negative current 627 in the d-q reference frame, $\theta_n$ is the negative phase angle 428, and $I_{a\_fbk}$, $I_{b\_fbk}$, $I_{c\_fbk}$ are three phase current components of the feedback system current 344. The first negative LPF 53 removes high frequency components from the d-axis negative current 625 and outputs the d-axis negative current 626). The second negative LPF 55 removes high frequency components from the q-axis negative current 627 and outputs the q-axis negative current 628.

Figure 6:
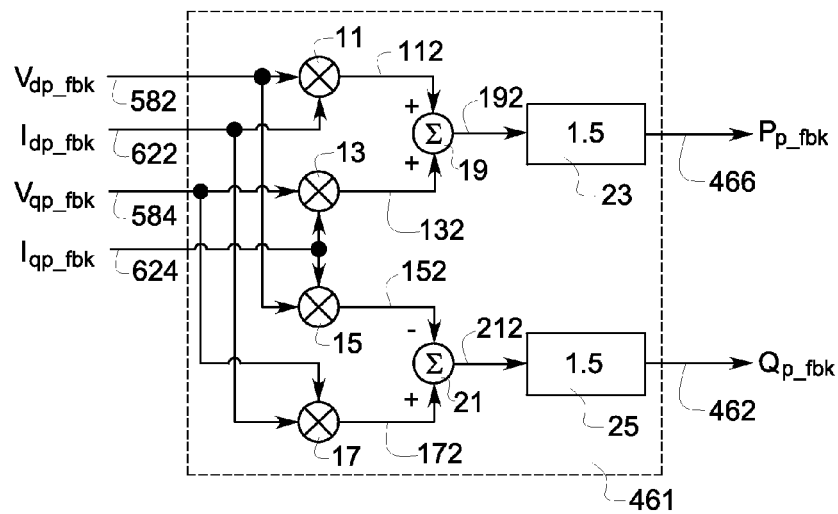
FIG. 6 is a block diagram of a first power calculation module of the power calculation circuit shown in FIG. 3 in accordance with an exemplary embodiment.

FIG. 6 illustrates a block diagram of a first power calculation module 461 of the power calculation circuit 46 shown in FIG. 3 in accordance with an exemplary embodiment. The first power calculation module 461 is configured to calculate the feedback positive reactive power 462 and the feedback positive active power 466 according to the feedback positive voltages 582, 584 and feedback positive currents 622, 624. In one implementation, the first power calculation module 461 includes a first multiplication element 11, a second multiplication element 13, a third multiplication element 15, a fourth multiplication element 17, a first summation element 19, a second summation element 21, a first processing element 23, and a second processing element 25. The first multiplication element 11 multiplies the d-axis positive voltage 582 with the d-axis positive current 622 and provides a first multiplied signal 112. The second multiplication element 13 multiplies the q-axis positive voltage 584 with the q-axis positive current 624 and provides a second multiplied signal 132. The first summation element 19 sums the first multiplied signal 112 and the second multiplied signal 132 and provides a summation signal 192. The summation signal 192 is processed by the first processing element 23 to provide the feedback positive active power 466. In one example, the first processing element 23 multiplies the summation signal 192 by a coefficient or factor of 1.5. The third multiplication element 15 multiplies the d-axis positive voltage 582 with the q-axis positive current 624 and provides a third multiplied signal 152. The fourth multiplication element 17 multiplies the q-axis positive voltage 584 with the d-axis positive current 622 and provides a fourth multiplied signal 172. The second summation element 21 subtracts the third multiplied signal 152 from the fourth multiplied signal 172 and provides a subtracted signal 212. The subtracted signal 212 is processed by the second processing element 25 to provide the feedback positive reactive power 462. In one example, processing element 25 multiplies the subtracted signal 212 by a coefficient or factor of 1.5.

Figure 7:
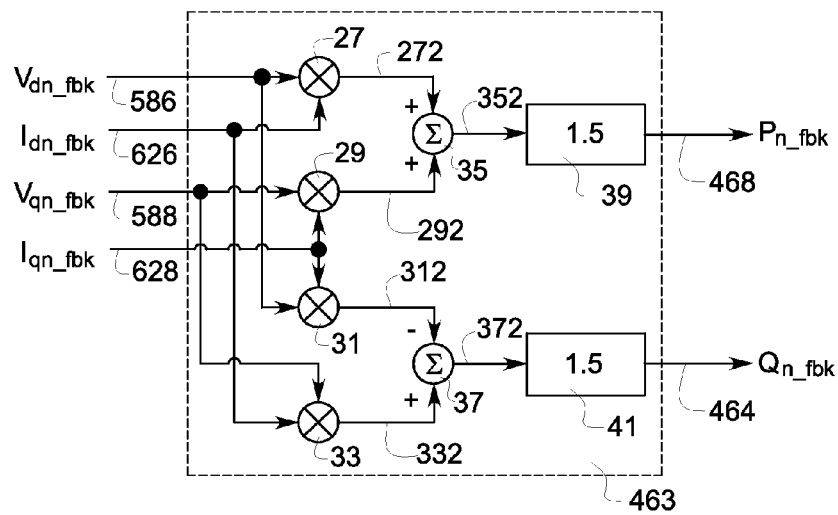
FIG. 7 is a block diagram of a second power calculation module of the power calculation circuit shown in FIG. 3 in accordance with an exemplary embodiment.

FIG. 7 illustrates a block diagram of a second power calculation module 463 of the power calculation circuit 46 shown in FIG. 3 in accordance with an exemplary embodiment. The second power calculation module 463 is configured to calculate the feedback negative reactive power 464 and the feedback negative active power 468 according to the feedback negative voltages 586, 588 and the feedback negative currents 626, 628. In one implementation, the second power calculation module 463 includes a first multiplication element 27, a second multiplication element 29, a third multiplication element 31, a fourth multiplication element 33, a first summation element 35, a second summation element 37, a first processing element 39, and a second processing element 41. The first multiplication element 27 multiplies the d-axis negative voltage 586 with the d-axis negative current 626 and provides a first multiplied signal 272. The second multiplication element 29 multiplies the q-axis negative voltage 588 with the q-axis negative current 628 and provides a second multiplied signal 292. The first summation element 35 sums the first multiplied signal 272 and the second multiplied signal 292 and provides a summation signal 352. The summation signal 352 is processed by the first processing element 39 to get the feedback negative active power 468. The third multiplication element 31 multiplies the d-axis negative voltage 586 with the q-axis negative current 628 and provides a third multiplied signal 312. The fourth multiplication element 33 multiplies the q-axis negative voltage 588 with the d-axis negative current 626 and provides a fourth multiplied signal 332. The second summation element 37 subtracts the third multiplied signal 312 from the fourth multiplied signal 332 and provides a subtracted signal 372. The subtracted signal 372 is processed by the second processing element 41 to get the feedback negative reactive power 464.

Figure 8:
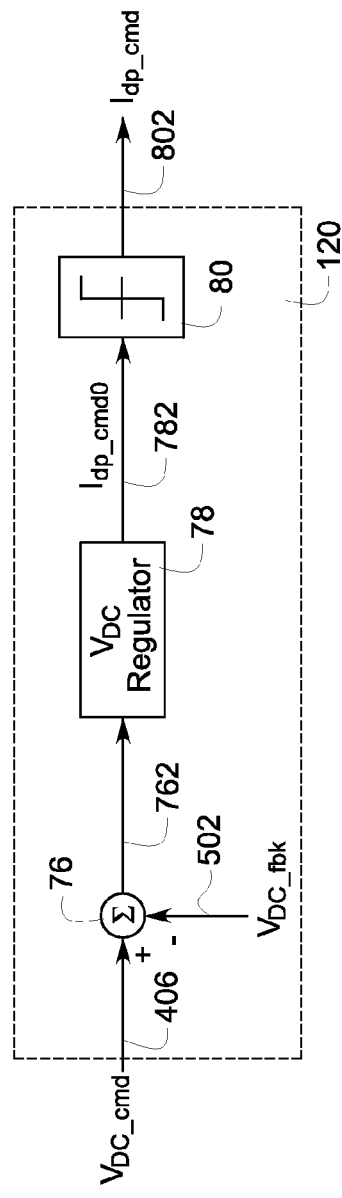
FIG. 8 is a block diagram of a first positive regulation module of a positive power regulator shown in FIG. 2 in accordance with an exemplary embodiment.

FIG. 8 illustrates a block diagram of a first positive regulation module 120 of the positive power regulator 48 shown in FIG. 2 in accordance with an exemplary embodiment. The first positive regulation module 120 is configured to regulate the feedback DC voltage 502 from the DC sensor 50 as well as the DC command 406 and to provide a d-axis positive current command 802. In one implementation, the first positive regulation module 120 includes a first summation element 76, a DC voltage regulator 78, and a current limiter 80 coupled in series. The feedback DC voltage 502 is subtracted from the DC command 406 by the first summation element 76 to provide a difference DC voltage command 762. The difference DC voltage command 762 is regulated by the DC voltage regulator 78 to provide a d-axis positive current command 782. The current limiter 80 limits the d-axis positive current command 782, such that the resulting d-axis positive current command 802 does not exceed the capability of the grid-side converter 26 (FIG. 1).

Figure 9:
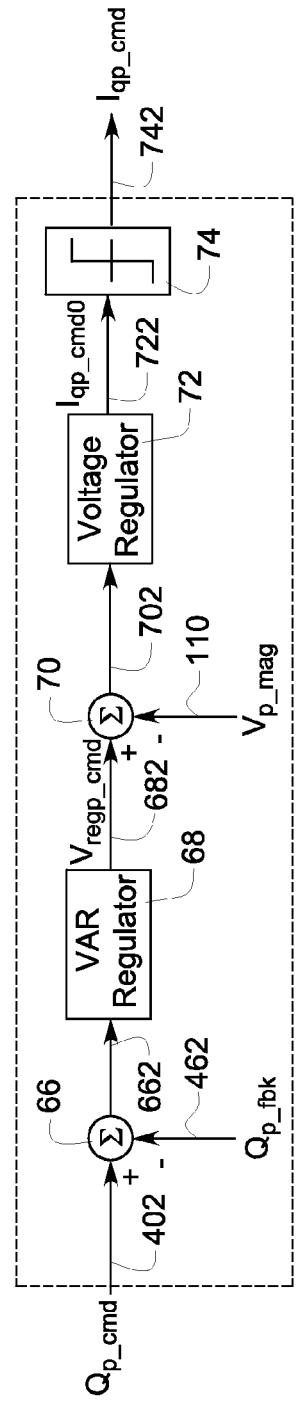
FIG. 9 is a block diagram of a second positive regulation module of a positive power regulator shown in FIG. 2 in accordance with an exemplary embodiment.

FIG. 9 illustrates a block diagram of a second positive regulation module 140 of the positive power regulator 48 shown in FIG. 2 in accordance with an exemplary embodiment. The second positive regulation module 140 is configured to regulate the feedback positive reactive power 462 from the power calculation circuit 46 according to the positive reactive power command 402 and to provide a q-axis positive current command 742. In one implementation, the second positive regulation module 140 includes a first summation element 66, a VAR regulator 68, a second summation element 70, a voltage regulator 72, and a current limiter 74 coupled in series. The feedback positive reactive power 462 is subtracted from the positive reactive power command 402 by the first summation element 66 to provide a difference positive reactive power command 662. The difference positive reactive power command 662 is regulated by the VAR regulator 68 to provide a regulated voltage command 682. A positive voltage magnitude 110 is subtracted from the regulated voltage command 682 by the second summation element 70 to provide a difference regulated voltage command 702. The positive voltage magnitude 110 can be calculated by the following expression: $V_{P\_mag} = \sqrt{V_{dp}^2 + V_{qp}^2}$ (3) wherein $V_{p\_mag}$ is positive voltage magnitude 110, $V_{dp}$ is the d-axis positive voltage 582, and $V_{qp}$ is the q-axis positive voltage 584. The difference regulated voltage command 702 is further regulated by the voltage regulator 72 to provide a q-axis positive current command 722. The current limiter 74 limits the q-axis positive current command 722, such that the resulting q-axis positive current command 742 does not exceed the capability of the grid-side converter 26 (FIG. 1).

FIG. 10 illustrates a block diagram of a first negative regulation module 260 of the negative power regulator 52 of FIG. 2 in accordance with an exemplary embodiment. The first negative regulation module 260 is configured to regulate the q-axis negative voltage 588 and to provide a d-axis negative current command 105. In one implementation, the first negative regulation module 260 emulates a L-R load in negative sequence, e.g., an inductance in negative sequence. The first negative regulation module 260 includes a multiplication element 98, a filter 102, and a limiter 104 coupled in series. The multiplication element 98 multiplies the q-axis negative voltage 588 by a q-axis gain signal 230 and provides a d-axis negative current 982. The filter 102 filters the d-axis negative current 982 according to a q-axis signal 250 and provides a filtered d-axis negative current command 1022. The q-axis signal 250 is a predetermined signal and is supplied for indicating a bandwidth of the filter 102. The limiter 104 limits the filtered d-axis negative current command 1022 and provides the d-axis negative current command 105.

FIG. 11 illustrates a block diagram of a second negative regulation module 280 of the negative power regulator 52 of FIG. 2 in accordance with an exemplary embodiment. The second negative regulation module 280 is configured to regulate the d-axis negative voltage 586 and to provide a q-axis negative current command 113. In one implementation, the second negative regulation module 280 also emulates a L-R load in negative sequence, e.g., an inductance in negative sequence. The second negative regulation module 280 includes a multiplication element 106, a filter 108, and a limiter 112 coupled in series. The multiplication element 106 multiplies the d-axis negative voltage 586 by a gain signal 270 and provides a q-axis negative current 1062. The filter 108 filters the q-axis negative current 1062 according to a d-axis signal 290 and provides a filtered q-axis negative current signal 1082. The d-axis signal 290 is also a predetermined signal and is supplied for indicating a bandwidth of the filter 108. The limiter 112 limits the filtered q-axis negative current signal 1082 and provides the q-axis negative current command 113.

Figure 12:
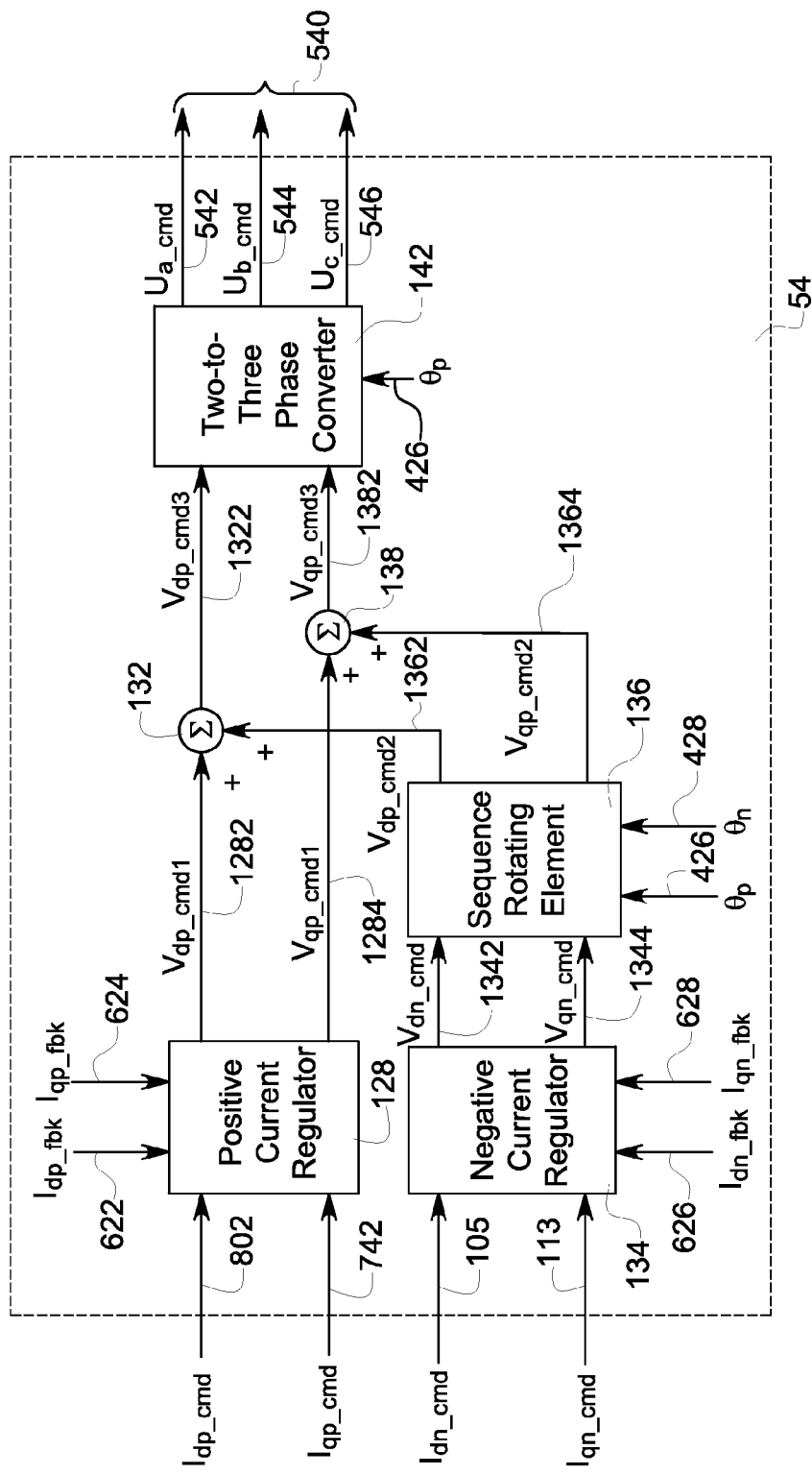
FIG. 12 is a block diagram of a current regulator of the controller shown in FIG. 2 in accordance with an exemplary embodiment.

FIG. 12 illustrates a block diagram of the current regulator 54 shown in FIG. 2. The current regulator 54 is configured to control respective current errors of the feedback positive and negative current and the positive and negative current commands to zero in steady state. In one implementation, the current regulator 54 includes a positive current regulator 128, a negative current regulator 134, a first summation element 132, a second summation element 138, a sequence-rotating element 136, and a two-to-three phase converter 142.

As shown in FIG. 12, the positive current regulator 128 receives the d-axis positive current 622, the q-axis positive current 624, the d-axis positive current command 802, and the q-axis positive current command 742. The d-axis positive current 622 and the q-axis positive current 624 are regulated by the positive current regulator 128 according to the d-axis positive current command 802 and the q-axis positive current command 742 to provide a first d-axis positive voltage command 1282 and a first q-axis positive voltage command 1284.

As shown in FIG. 12, the negative current regulator 134 receives the d-axis negative current 626, the q-axis negative current 628, the d-axis negative current command 105, and the q-axis negative current command 113. The d-axis negative current 626 and the q-axis negative current 628 are regulated by the negative current regulator 134 according to the d-axis negative current command 105 and the q-axis negative current command 113 to provide a d-axis negative voltage command 1342 and a q-axis negative voltage command 1344. The d-axis negative voltage command 1342 and the q-axis negative voltage command 1344 in the negative sequence are rotated by the sequence-rotating element 136 to provide a second d-axis positive voltage command 1362 and a second q-axis positive voltage command 1364 in the positive sequence. In one implementation, the sequence-rotating element 136 may rotate the negative voltage components to positive voltage components in the d-q reference frame according to the following matrix equation:

$$\begin{bmatrix} V_{dp\_cmd2} \\ V_{qp\_cmd2} \end{bmatrix} = \begin{bmatrix} \cos\Delta\theta & \sin\Delta\theta \\ -\sin\Delta\theta & \cos\Delta\theta \end{bmatrix} \begin{bmatrix} V_{dn\_cmd} \\ V_{qn\_cmd} \end{bmatrix}, \quad (4)$$

where $V_{dp\_cmd2}$ is the second d-axis positive voltage command 1362, $V_{qp\_cmd2}$ is the second q-axis positive voltage command 1364, $\Delta\theta = \theta_p - \theta_n$, $\theta_p$ is the positive phase angle 426, θ$_n$ is the negative phase angle 428, V$_{dn\_cmd}$ is the d-axis negative voltage command 1342, and V$_{qn\_cmd}$ is the q-axis negative voltage command 1344.

As further shown in FIG. 12, the first d-axis positive voltage command 1282 and the second d-axis positive voltage command 1362 are summed by the first summation element 132 to provide a third d-axis positive voltage command 1322. The first q-axis positive voltage command 1284 and the second q-axis positive voltage command 1364 are summed by the second summation element 138 to provide a third q-axis positive voltage command 1382. The third d-axis positive voltage command 1322 and the third q-axis positive voltage command 1382 are converted by the two-to-three phase converter 142 to provide three-phase voltage commands 542, 544, 546 according to the positive phase angle 426. In one implementation, the two-to-three phase converter 142 may convert the two phase voltage commands in the d-q reference frame to the three phase voltage commands according to the following matrix equation:

$$\begin{bmatrix} U_{a\_cmd} \\ U_{b\_cmd} \\ U_{c\_cmd} \end{bmatrix} = \begin{bmatrix} \cos\theta_p & -\sin\theta_p \\ \cos\left(\theta_p - \frac{2}{3}\pi\right) & -\sin\left(\theta_p - \frac{2}{3}\pi\right) \\ \cos\left(\theta_p + \frac{2}{3}\pi\right) & -\sin\left(\theta_p + \frac{2}{3}\pi\right) \end{bmatrix} \begin{bmatrix} V_{dp\_cmd3} \\ V_{qp\_cmd3} \end{bmatrix}, \quad (5)$$

where U$_{a\_cmd}$, U$_{b\_cmd}$, U$_{c\_cmd}$ are the three phase voltage command components 542, 544, 546 of the voltage command 540 respectively, θ$_p$ is the positive phase angle 426, and V$_{dp\_cmd3}$, V$_{qp\_cmd3}$ are the third d-axis positive voltage command 1322 and the third q-axis positive voltage command 1382 respectively in the d-q reference frame. The three-phase voltage commands 542, 544, 546 are applied to the PWM modulator 56 to produce the control signal 408 for driving the grid-side converter 26 to generate desired current output.

As described above, the controller 40 is operated to decouple positive sequence voltage and current components and negative sequence voltage and current components from the power transmitted to the electrical grid 30. In one aspect of the disclosure, the controller 40 is further operated to calculate positive reactive power according to the decoupled positive sequence voltage and current components and to calculate negative reactive power according to the decoupled negative sequence voltage and current components. Because the positive reactive power and the negative reactive power are independently calculated, the controller 40 is further operated to perform positive reactive power regulation in the positive sequence and to perform negative reactive power regulation in the negative sequence. In this condition, both positive sequence reactive power and negative sequence reactive power are regulated, so that the reactive power of the power transmitted to the electrical grid 30 can be adjusted more accurately.

Figure 13:
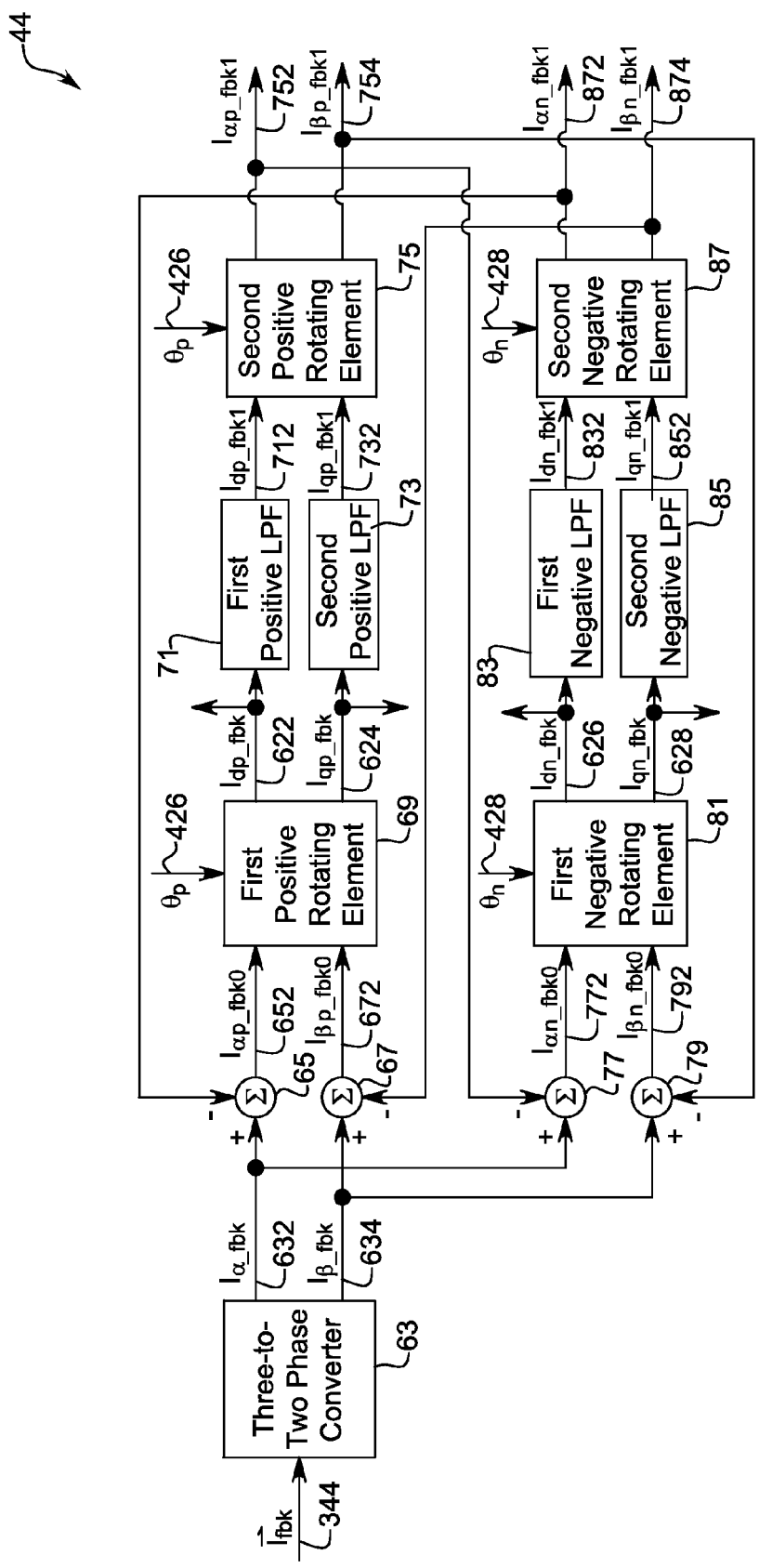
FIG. 13 is a block diagram of another embodiment of a current decoupling circuit for use in the embodiment in FIG. 3.

FIG. 13 illustrates a block diagram of another embodiment of the current decoupling circuit 44 for use in the embodiment of FIG. 3. In one implementation, the current decoupling circuit 44 includes a three-to-two phase converter 63, a first summation element 65, a second summation element 67, a first positive rotating element 69, a first positive low pass filter (LPF) 71, a second positive LPF 73, a second positive rotating element 75, a third summation element 77, a fourth summation element 79, a first negative rotating element 81, a first negative LPF 83, a second negative LPF 85, and a second negative rotating element 87. The three-to-two phase converter 63 is coupled to the current sensor 34 (FIG. 1) to receive the feedback system current 344 from the current sensor 34. The current decoupling circuit 44 is constructed in a cross-coupled manner. More specifically, in one aspect, two outputs of the second positive rotating element 75 are coupled to the third summation element 77 and the fourth summation element 79 respectively, and two outputs of the second negative rotating element 87 are coupled to the first summation 65 and the second summation element 67 respectively.

In one implementation, the three-to-two phase converter 63 converts the three-phase feedback system current 344 to two-phase feedback current, i.e., an α-axis feedback current 632 and an β-axis feedback current 634. In one implementation, the three-to-two phase converter 63 may convert the three-phase feedback system current 344 to two-phase feedback current according to the following matrix equation:

$$\begin{bmatrix} I_{\alpha\_fbk} \\ I_{\beta\_fbk} \end{bmatrix} = \begin{bmatrix} \frac{2}{3} & -\frac{1}{3} & -\frac{1}{3} \\ 0 & \frac{\sqrt{3}}{3} & -\frac{\sqrt{3}}{3} \end{bmatrix} \begin{bmatrix} I_{a\_fbk} \\ I_{b\_fbk} \\ I_{c\_fbk} \end{bmatrix}, \quad (6)$$

wherein I$_{\alpha\_fbk}$, I$_{\beta\_fbk}$ are the α-axis feedback current 632 and the β-axis feedback current 634 respectively in the α-β reference frame, and I$_{a\_fbk}$, I$_{b\_fbk}$, I$_{c\_fbk}$ are three phase current components of the feedback system current 344. As an α-axis negative feedback current 872 and an β-axis negative feedback current 874 are derived from the second negative rotating element 87, the first summation element 65 subtracts the α-axis negative feedback current 872 from the α-axis feedback current 632 and outputs an α-axis positive feedback current 652. The second summation element 67 subtracts the β-axis negative feedback current 874 from the β-axis feedback current 634 and outputs an β-axis positive feedback current 672.

The first positive rotating element 69 rotates the α-axis positive feedback current 652 and the β-axis positive feedback current 672 according to the positive phase angle 426 and outputs a d-axis positive current 622 and a q-axis positive current 624. In one implementation, the first positive rotating element 69 may rotate the two phase positive current in the α-β reference frame to the two phase positive current in the d-q reference frame according to the following matrix equation:

$$\begin{bmatrix} I_{dp\_fbk} \\ I_{qp\_fbk} \end{bmatrix} = \begin{bmatrix} \cos\theta_p & \sin\theta_p \\ -\sin\theta_p & \cos\theta_p \end{bmatrix} \begin{bmatrix} I_{\alpha p\_fbk0} \\ I_{\beta p\_fbk0} \end{bmatrix}, \quad (7)$$

where I$_{dp\_fbk}$, I$_{qp\_fbk}$ are the d-axis positive current 622 and the q-axis positive current 624 respectively in the d-q reference frame, θ$_p$ is the positive phase angle 426, and I$_{\alpha p\_fbk0}$, I$_{\beta p\_fbk0}$ are the α-axis positive feedback current 652 and the β-axis positive feedback current 672 respectively in the α-β reference frame. The first positive LPF 71 and the second positive LPF 73 respectively remove high frequency components from the d-axis positive current 622 and the q-axis positive current 624 and output a filtered d-axis positive current 712 and a filtered q-axis positive current 732 correspondingly. The second positive rotating element 75 rotates the filtered d-axis positive current 712 and the filtered q-axis positive current 732 back to an α-axis positive feedback current 752 and an β-axis positive feedback current 754 according to the positive phase angle 426. In one implementation, the second positive rotating element 75 may rotate the two phase positive current in the d-q reference frame to the two phase positive current in the α-β reference frame according to the following matrix equation:

$$\begin{bmatrix} I_{\alpha p\_fbk1} \\ I_{\beta p\_fbk1} \end{bmatrix} = \begin{bmatrix} \cos\theta_p & -\sin\theta_p \\ \sin\theta_p & \cos\theta_p \end{bmatrix} \begin{bmatrix} I_{dp\_fbk} \\ I_{qp\_fbk} \end{bmatrix}, \quad (8)$$

where $I_{\alpha p\_fbk1}$, $I_{\beta p\_fbk1}$ are the α-axis positive feedback current 752 and the β-axis positive feedback current 754 respectively in the α-β reference frame, $\theta_p$ is the positive phase angle 426, and $I_{dp\_fbk}$, $I_{qp\_fbk}$ are the d-axis positive current 712 and the q-axis positive current 732 respectively in the d-q reference frame. In one implementation, the d-axis positive current 622 and the q-axis positive current 624 are transmitted to the power calculation circuit 46 (FIG. 3) for calculating instantaneous active power and reactive power in positive and negative sequence respectively. It should be noted that, in an alternative embodiment, the filtered d-axis positive current 712 and the filtered q-axis positive current 732 are transmitted to the power calculation circuit 46 (FIG. 3) for calculating power.

Further referring to FIG. 13, the third summation element 77 subtracts the α-axis positive feedback current 752 from the α-axis feedback current 632 and outputs an α-axis negative feedback current 772. The fourth summation element 79 subtracts the β-axis positive feedback current 754 from the β-axis feedback current 634 and outputs an β-axis negative feedback current 792. The first negative rotating element 81 rotates the α-axis negative feedback current 772 and the β-axis negative feedback current 792 according to the negative phase angle 428 and outputs a d-axis negative current 626 and a q-axis negative current 628. In one implementation, the first negative rotating element 81 may rotate the two phase negative current in the α-β reference frame to the two phase negative current in the d-q reference frame according to the following matrix equation:

$$\begin{bmatrix} I_{dn\_fbk} \\ I_{qn\_fbk} \end{bmatrix} = \begin{bmatrix} \cos\theta_n & \sin\theta_n \\ -\sin\theta_n & \cos\theta_n \end{bmatrix} \begin{bmatrix} I_{\alpha n\_fbk0} \\ I_{\beta n\_fbk0} \end{bmatrix}, \quad (9)$$

where $I_{dn\_fbk}$, $I_{qn\_fbk}$ are the d-axis negative current 626 and the q-axis negative current 628 respectively in the d-q reference frame, $\theta_n$ is the negative phase angle 428, and $I_{\alpha n\_fbk0}$, $I_{\beta n\_fbk0}$ are the α-axis negative feedback current 772 and the β-axis negative feedback current 792 respectively in the α-β reference frame. The first negative LPF 83 and the second negative LPF 85 respectively remove high frequency components from the d-axis negative current 626 and the q-axis negative current 628 and output a filtered d-axis negative current 832 and a filtered q-axis negative current 852 correspondingly. The second negative rotating element 87 rotates the filtered d-axis negative current 832 and the filtered q-axis negative current 852 back to an α-axis negative feedback current 872 and an β-axis negative feedback current 874 according to the negative phase angle 428. In one implementation, the second negative rotating element 87 may rotate the two phase positive current in the d-q reference frame to the two phase positive current in the α-β reference frame according to the following matrix equation:

$$\begin{bmatrix} I_{\alpha n\_fbk1} \\ I_{\beta n\_fbk1} \end{bmatrix} = \begin{bmatrix} \cos\theta_n & -\sin\theta_n \\ \sin\theta_n & \cos\theta_n \end{bmatrix} \begin{bmatrix} I_{dn\_fbk} \\ I_{qn\_fbk} \end{bmatrix}, \quad (10)$$

where $I_{\alpha n\_fbk1}$, $I_{\beta n\_fbk1}$ are the α-axis negative feedback current 872 and the β-axis negative feedback current 874 respectively in the α-β reference frame, $\theta_n$ is the negative phase angle 428, and $I_{dn\_fbk}$, $I_{qn\_fbk}$ are the d-axis negative current 832 and the q-axis negative current 852 respectively in the d-q reference frame. In one implementation, the d-axis negative current 626 and the q-axis negative current 628 are outputted to the power calculation circuit 46 (FIG. 3) for calculating instantaneous active power and reactive power in positive and negative sequence respectively. It should be noted that, in an alternative embodiment, the filtered d-axis negative current 832 and the filtered q-axis negative current 852 are transmitted to the power calculation circuit 46 (FIG. 3) for calculating power.

In alternative embodiments, the controller 40 of the system 100 may be further configured to have the capability of providing vector VAR control or vector VAR regulation even when the electrical grid 30 is subjected to voltage ride through conditions, such as low voltage ride through (LVRT), zero voltage ride through (ZVRT), and high voltage ride through (HVRT) conditions.

Figure 14:
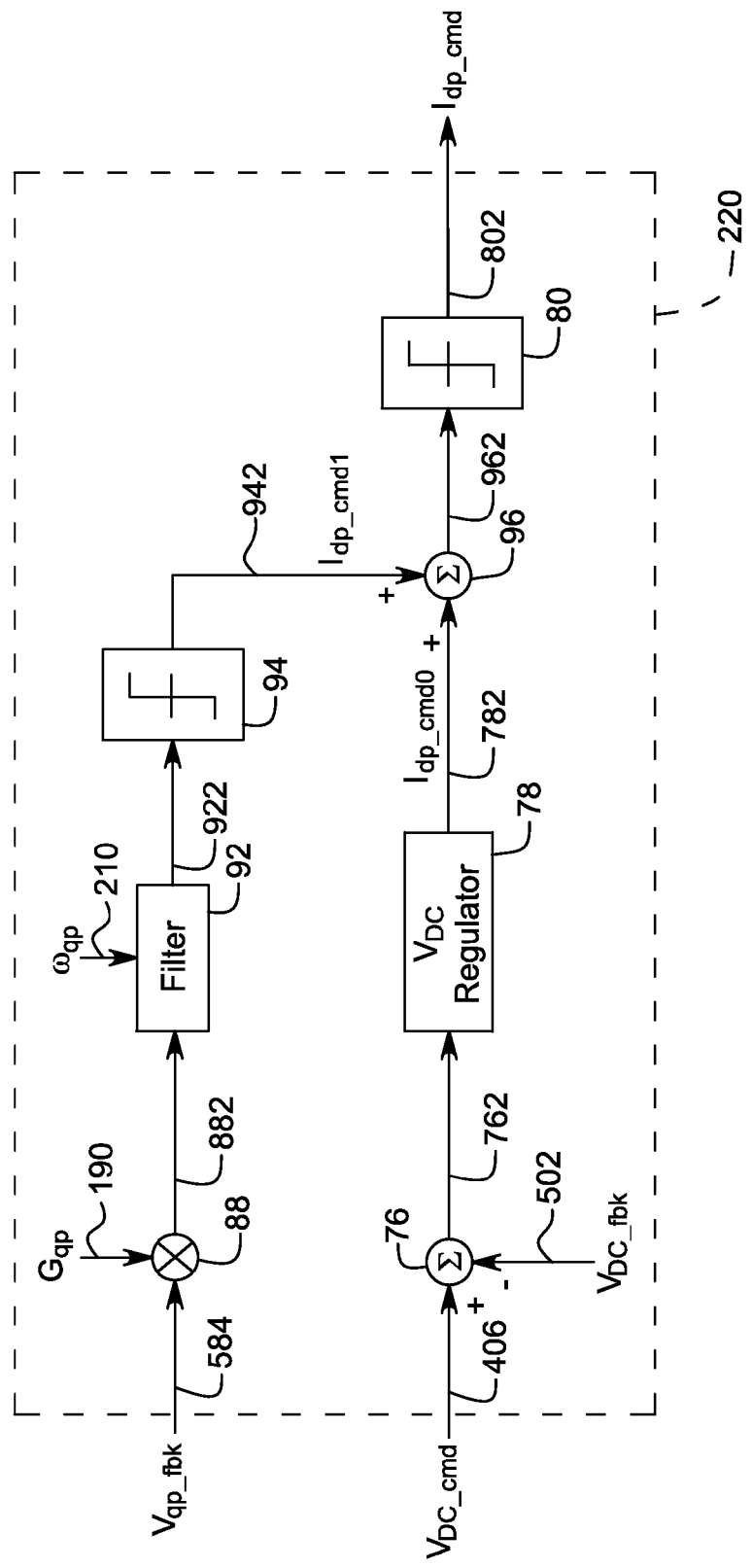
FIG. 14 is a block diagram of the first positive regulation module of the positive power regulator shown in FIG. 2 in accordance with another exemplary embodiment.

FIG. 14 illustrates a block diagram of a first positive regulation module 220 of the positive power regulator 48 shown in FIG. 2 in accordance with another exemplary embodiment. The first positive regulation module 220 is configured to provide a current command in consideration of voltage ride through conditions. In one implementation of the disclosure, the first positive regulation module 220 includes a first summation element 76, a DC voltage regulator 78, a second summation element 96, a first current limiter 80, a multiplication element 88, a filter 92, and a second current limiter 94.

As shown in a lower part of FIG. 14, the feedback DC voltage 502 is subtracted from the DC command 406 by the first summation element 76 to provide a difference DC voltage command 762. The difference DC voltage command 762 is regulated by the DC voltage regulator 78 to provide a first d-axis positive current command 782. As shown in an upper part of FIG. 11, the multiplication element 88 multiplies the q-axis positive voltage 584 by a q-axis gain signal 190 and provides a d-axis positive current 882. The filter 92 filters the d-axis positive current 882 according to a q-axis signal 210 and provides a filtered d-axis positive current command 922. The q-axis signal 210 is supplied for indicating a bandwidth of the filter 92. The second current limiter 94 limits the filtered d-axis positive current command 922 and provides a second d-axis positive current command 942. The second summation element 96 sums the first d-axis positive current command 782 and the second d-axis positive current command 942 and provides a third d-axis positive current command 962. The first current limiter 80 limits the third d-axis positive current command 962 and provides a limited d-axis positive current command 802. The limited d-axis positive current command 802 is transmitted to the positive current regulator 128.

Figure 15:
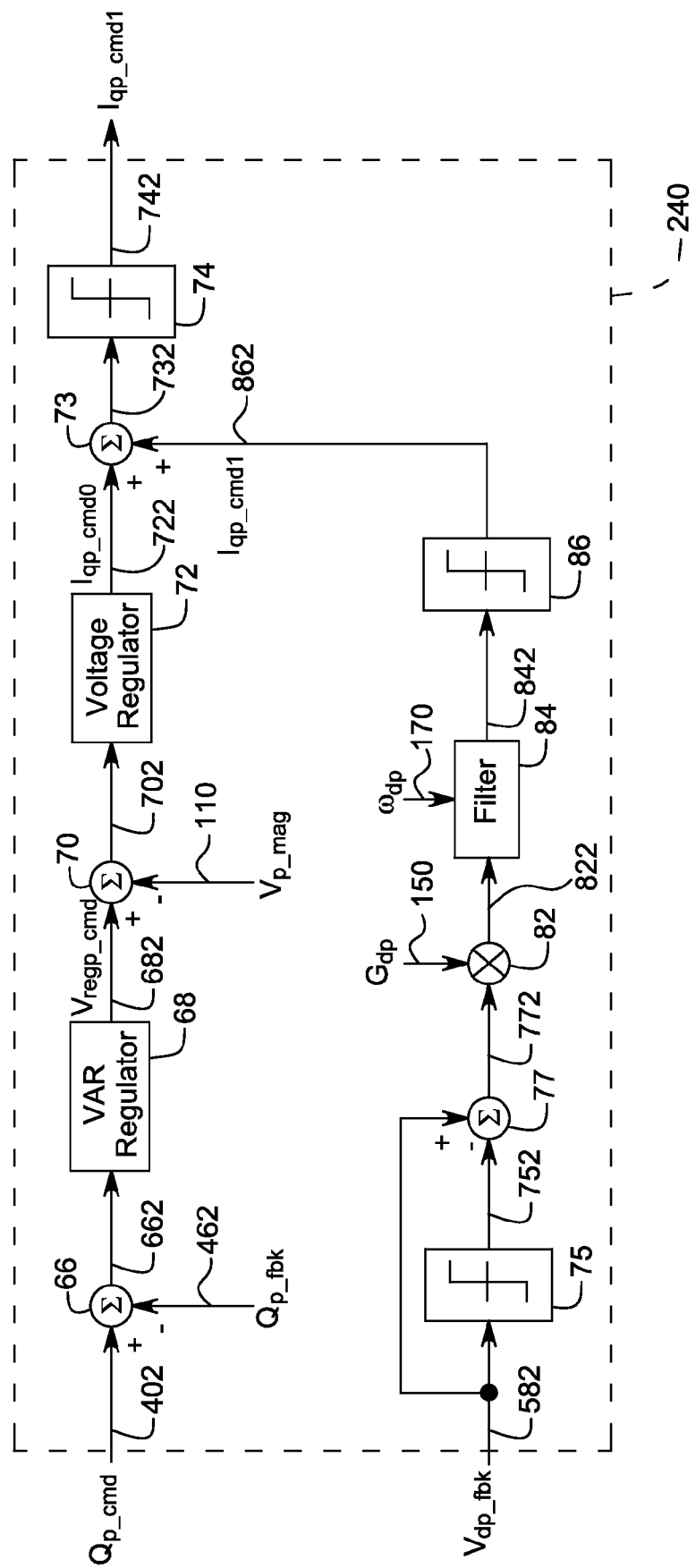
FIG. 15 is a block diagram of the second positive regulation module of the positive power regulator shown in FIG. 2 in accordance with another exemplary embodiment.

FIG. 15 illustrates a block diagram of a second positive regulation module 240 of the positive power regulator 48 shown in FIG. 2 in accordance with another exemplary embodiment. The second positive regulation module 240 is configured to provide a current command in consideration of voltage ride through conditions. In one implementation of the disclosure, the second positive regulation module 240 includes a first summation element 66, a VAR regulator 68, a second summation element 70, a voltage regulator 72, a voltage limiter 75, a third summation element 77, a gain element 82, a filter 84, a first current limiter 86, a fourth summation element 73, and a second current limiter 74.

As shown in an upper branch of FIG. 15, the feedback positive reactive power 462 is subtracted from the positive reactive power command 402 by the first summation element 66 to provide a difference positive reactive power command 662. The difference positive reactive power command 662 is regulated by the VAR regulator 68 and to provide a regulated positive voltage command 682. In one implementation, the VAR regulator 68 may include a proportional integral (PI) controller. Other type of controllers can also be used, for example, proportional derivative (PD) controllers, and proportional integral derivative (PID) controllers. A positive voltage magnitude 110 is subtracted from the regulated positive voltage command 682 by the second summation element 70 to provide a difference positive voltage command 702. The positive voltage magnitude 110 can be calculated by the expression (3) as discussed above with reference to FIG. 9. The difference positive voltage command 702 is further regulated by the voltage regulator 72 to provide a first q-axis positive current command 722. In one implementation, the voltage regulator 72 may include a PI controller. Other type of controllers can also be used, for example, proportional derivative (PD) controllers, and proportional integral derivative (PID) controllers.

As shown in a lower branch of FIG. 15, the voltage limiter 75 limits the d-axis positive voltage 582 and provides a limited d-axis positive voltage 752. The limited d-axis positive voltage 752 is subtracted from the d-axis positive voltage 582 by the third summation element 77 to provide a difference d-axis positive voltage 772. The gain element 82 multiplies the difference d-axis positive voltage 772 by a d-axis gain signal 150 and provides a q-axis positive current 822. The filter 84 filters the q-axis positive current 822 according to a d-axis signal 170 and provides a filtered q-axis positive current command 842. The d-axis signal 170 is a predetermined signal and is supplied for indicating a bandwidth of the filter 84. The filtered q-axis positive current command 842 is limited by the first current limiter 86 to provide a second q-axis positive current command 862. The fourth summation element 73 sums the first q-axis positive current command 722 and the second q-axis positive current command 862 and provides a third q-axis positive current command 732. The second current limiter 74 limits the third q-axis positive current command 732 and provides a limited q-axis positive current command 742. The limited q-axis positive current command 742 is transmitted to the positive current regulator 128 of FIG. 12.

Figure 16:
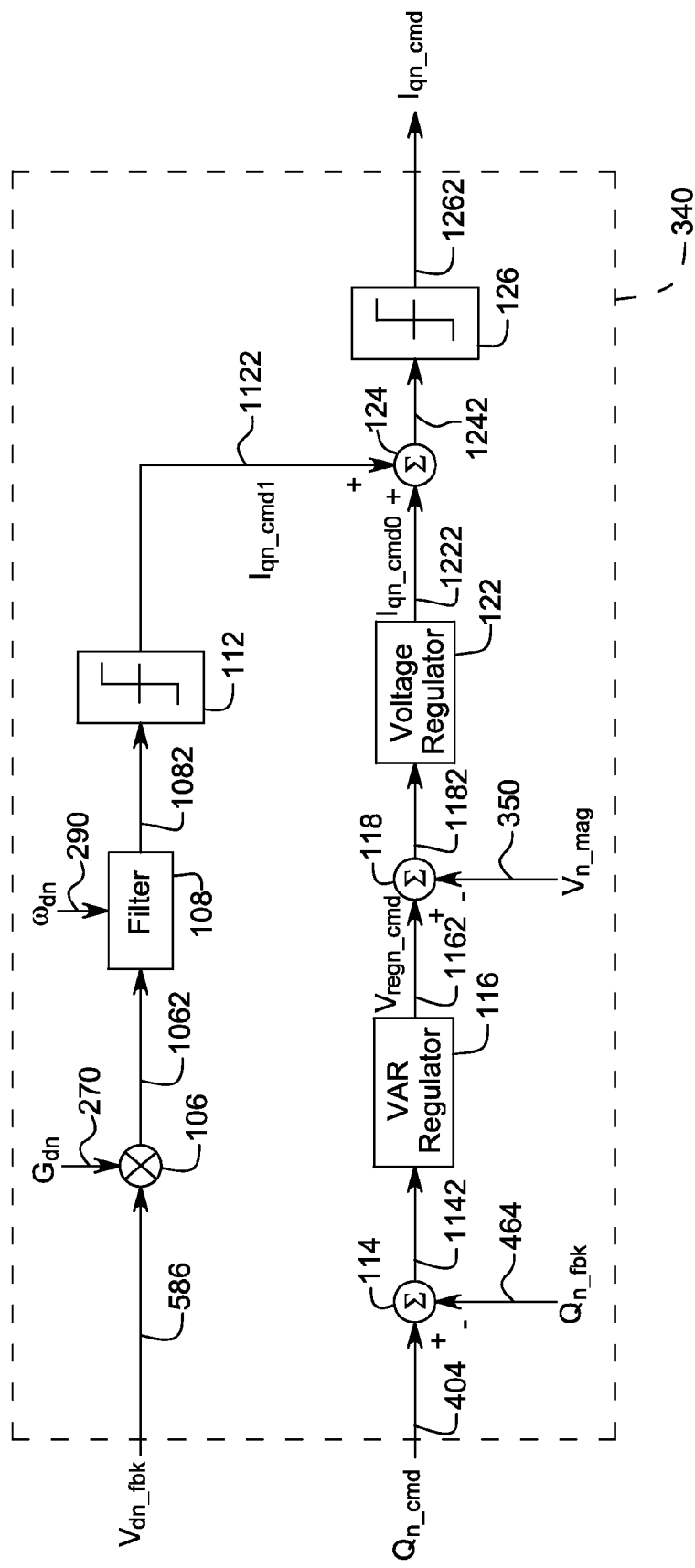
FIG. 16 is a block diagram of the second negative regulation module of the negative power regulator shown in FIG. 2 in accordance with another exemplary embodiment.

FIG. 16 illustrates a block diagram of a second negative regulation module 340 of the negative power regulator 52 shown in FIG. 2 in accordance with another exemplary embodiment. The second negative regulation module 340 is configured to regulate the d-axis negative voltage 586 and further to regulate the feedback negative reactive power 464 according to the negative reactive power command 404 to provide a q-axis negative current command 1262. In one implementation, the second negative regulation module 340 includes a multiplication element 106, a filter 108, a first limiter 112, a first summation element 114, a VAR regulator 116, a second summation element 118, a voltage regulator 122, a third summation element 124, and a second current limiter 126.

As shown in an upper branch of FIG. 16, the multiplication element 106 multiplies the d-axis negative voltage 584 by a d-axis gain signal 270 and provides a multiplied d-axis negative voltage 1062. The filter 108 processes the multiplied d-axis negative voltage 1062 according to a d-axis signal 290 and provides a first q-axis negative current command 1082. The first limiter 112 limits the q-axis negative current command 1082 and provides a limited first q-axis negative current command 1122.

As shown in a lower branch of FIG. 16, the feedback negative reactive power 464 is subtracted from the negative reactive power command 404 by the first summation element 114 to provide a difference negative reactive power command 1142. The difference negative reactive power command 1142 is regulated by the VAR regulator 116 and to provide a regulated negative voltage command 1162. A negative voltage magnitude 350 is subtracted from the regulated negative voltage command 1162 by the second summation element 118 to provide a difference negative voltage command 1182. The negative voltage magnitude 350 can be calculated by the following expression: $V_{n\_mag} = \sqrt{V_{dn}^2 + V_{qn}^2}$ (11), wherein $V_{n\_mag}$ is the negative voltage magnitude 350, $V_{dn}$ is the d-axis negative voltage 586, and $V_{qn}$ is the q-axis negative voltage 588. The difference positive voltage command 1182 is further regulated by the voltage regulator 122 to provide a second q-axis negative current command 1222. The third summation element 124 sums the first q-axis negative current command 1122 and the second q-axis negative current command 1222 and provides a third q-axis negative current command 1242. The second current limiter 126 limits the third q-axis negative current command 1242 and provides a limited q-axis negative current command 1262. The q-axis negative current command 1262 is transmitted to the negative current regulator 134 for current regulation.

It is understood that the controller 40 may be implemented in a variety of ways. For instance, the controller 40 may hardwired or implemented as a set of computer programs operating on a general-purpose computer with appropriate interfaces to the voltage sensor 32, the current sensor 34, and the DC sensor 50.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

What is claimed is:

1. A system for performing reactive power control, the system comprising:
a power converter coupled between a power source and an electrical grid, the power converter configured to convert a first form of electric power generated from the power source to a second form of electric power suitable to be distributed by the electrical grid; and
a controller coupled to the power converter, the controller configured to:
monitor the electric power transmitted between the power converter and the electrical grid,
decouple a positive sequence component and a negative sequence component from the monitored electric power,
perform a positive reactive power control with respect to the positive sequence component by:
generating a first d-axis positive current command according to a monitored DC voltage across a DC link of the power converter and a specified DC voltage command;
generating a first q-axis positive current command according to a calculated feedback positive reactive power and a specified positive reactive power;
regulating the first d-axis positive current command and the first q-axis positive current command to generate a d-axis positive voltage command and a q-axis positive voltage command; and
transforming the d-axis positive voltage command and the q-axis positive voltage command to generate voltage command signals,
perform a negative reactive power control with respect to the negative sequence component, and
transmit a control signal to the power converter based on the positive reactive power control and the negative reactive power control to enable the power converter to adjust a reactive power of the electric power transmitted between the power converter and the electrical grid.

2. The system of claim 1, wherein the controller is further configured to perform a positive active power control with respect to the positive sequence component and to perform a negative active power control with respect to the negative sequence component and wherein the controller is further configured to use the positive and negative active power controls in generating the control signal.

3. The system of claim 1, wherein the power source comprises an electrical machine, the power converter comprises a machine-side converter and a grid-side converter, the machine-side converter is electrically coupled to the electrical machine for converting alternating current (AC) electric power generated by the electrical machine to direct current (DC) electric power, and the grid-side converter is electrically coupled to the electrical grid for converting the DC electric power to AC electric power in response to the control signal transmitted from the controller.

4. The system of claim 3, wherein the DC link of the power converter is coupled between the machine-side converter and the grid-side converter, the system further comprises a DC sensor for measuring the monitored DC voltage across the DC link, and the controller is further configured to use the measured DC voltage in generating the control signal.

5. The system of claim 1, further comprising a voltage sensor configured to monitor a system voltage of the electric power transmitted between the power converter and the electrical grid and a current sensor configured to monitor a system current of the electric power transmitted between the power converter and the electrical grid.

6. The system of claim 5, wherein the controller comprises a crossed-coupled phase locked logic (CCPLL) circuit and a current decoupling circuit, wherein the CCPLL circuit is configured to decouple a positive sequence voltage component, a negative sequence voltage component, a positive phase angle, and a negative phase angle from the monitored system voltage; and wherein the current decoupling circuit is configured to decouple a positive sequence current component and a negative sequence current component from the monitored system current according to the positive phase angle and the negative phase angle.

7. The system of claim 6, wherein the controller further comprises a power calculating circuit configured to calculate the feedback positive reactive power according to the positive sequence voltage component and the positive sequence current component, and to calculate a feedback negative reactive power according to the negative sequence voltage component and the negative sequence current component.

8. The system of claim 7, wherein the controller further comprises:
a pulse width modulation (PWM) modulator to supply the control signal;
a positive power regulator to generate the first d-axis positive current command according to the DC voltage across the DC link of the power converter and the specified DC voltage command and to generate the first q-axis positive current command according to the calculated feedback positive reactive power and the specified positive reactive power; and
a positive current regulator to regulate the first d-axis positive current command and the first q-axis positive current command to generate the d-axis positive voltage command and the q-axis positive voltage command and to transform the d-axis positive voltage command and the q-axis positive voltage command to generate the voltage command signals, and to supply the voltage command signals to the PWM modulator.

9. The system of claim 8, wherein the positive power regulator is further configured to generate a second q-axis positive current command upon determination that a monitored d-axis voltage is being subjected to a voltage ride through condition, and to generate a third q-axis positive current command by summing the first q-axis positive current command and the second q-axis positive current command and to generate a second d-axis positive current command upon determination that a monitored q-axis voltage is being subjected to a voltage ride through condition, and to generate a third d-axis positive current command by summing the first d-axis positive current command and the second d-axis positive current command; wherein the positive current regulator is further configured to regulate the third d-axis positive current command and the third q-axis positive current command to generate the d-axis positive voltage command and the q-axis positive voltage command.

10. The system of claim 7, wherein the controller further comprises a pulse width modulation (PWM) modulator to supply the control signal; a negative power regulator to generate a first d-axis negative current command according to a monitored q-axis negative voltage and to generate a first q-axis negative current command according to a monitored d-axis negative voltage; and a negative current regulator to regulate the first d-axis negative current command and the first q-axis negative current command to generate a d-axis negative voltage command and a q-axis negative voltage command, to rotate the d-axis negative voltage command and the q-axis negative voltage command in a positive sequence, to transform the rotated d-axis negative voltage command and the rotated q-axis negative voltage command in the positive sequence to generate the voltage command signals, and to supply the voltage command signals to the PWM modulator.

11. The system of claim 10, wherein the negative power regulator is further configured to generate a second q-axis negative current command upon determination that a difference between a calculated feedback negative reactive power and a specified negative reactive power command is not zero, and to generate a third q-axis negative current command by summing the first q-axis negative current command and the second q-axis negative current command; wherein the negative current regulator is further configured to regulate the third q-axis negative current command to generate the q-axis negative voltage command.

12. The system of claim 1, wherein performing the positive reactive power control and the negative reactive power control comprises:
   calculating a positive reactive power with respect to the decoupled positive sequence component;
   calculating a negative reactive power with respect to the decoupled negative sequence component; and
   wherein the positive reactive power control is based on the calculated positive reactive power and the negative power control is based on the calculated negative reactive power control.

13. A method for performing reactive power control with respect to electric power transmitted between a power source and an electrical grid, the method comprising:
   monitoring the electric power transmitted between the power source and the electrical grid;
   decoupling a positive sequence component and a negative sequence component from the monitored electric power;
   performing a positive reactive power control with respect to the positive sequence component by generating a first d-axis positive current command according to a monitored DC voltage across a DC link of a power converter and a specified DC voltage command;
   generating a first q-axis positive current command according to a calculated feedback positive reactive power and a specified positive reactive power;
   regulating the first d-axis positive current command and the first q-axis positive current command to generate a d-axis positive voltage command and a q-axis positive voltage command;
   transforming the d-axis positive voltage command and the q-axis positive voltage command to generate voltage command signals;
   performing a negative reactive power control with respect to the negative sequence component; and
   adjusting a reactive power of the electric power transmitted between the power source and the electrical grid based on the positive reactive power control and the negative reactive power control.

14. The method of claim 13, further comprising:
   performing a positive active power control with respect to the positive sequence component; and
   performing a negative active power control with respect to the negative sequence component.

15. The method of claim 13, wherein decoupling the positive sequence component and the negative sequence component from the monitored electric power comprises:
   decoupling a positive sequence voltage component, a negative sequence voltage component, a positive phase angle, and a negative phase angle from a monitored voltage of the electric power;
   using the positive phase angle and the negative phase angle while decoupling a positive sequence current component and a negative sequence current component from a monitored current of the electric power; and
   calculating a feedback positive reactive power and a feedback negative reactive power using the decoupled positive sequence voltage component, the decoupled negative sequence voltage component, the decoupled positive sequence current component, and the decoupled negative sequence current component.

16. The method of claim 13, further comprising
supplying the voltage command signals to a pulse-width modulation (PWM) modulator to trigger the PWM modulator to generate a control signal.

17. The method of claim 16, further comprising:
   determining whether a monitored d-axis voltage is being subjected to a voltage ride through condition;
   generating a second q-axis positive current command according to the monitored d-axis voltage upon determination that the monitored d-axis voltage is being subjected to a voltage ride through condition;
   generating a third q-axis positive current command by summing the first q-axis positive current command and the second q-axis positive current command;
   determining whether a monitored q-axis voltage is being subjected to a voltage ride through condition;
   generating a second d-axis positive current command according to the monitored q-axis voltage upon determination that the monitored q-axis voltage is being subjected to a voltage ride through condition;
   generating a third d-axis positive current command by summing the first d-axis positive current command and the second d-axis positive current command; and
   regulating the third d-axis positive current command and the third q-axis positive current command to generate the d-axis positive voltage command and the q-axis positive voltage command.

18. The method of claim 13, wherein performing the negative reactive power control with respect to the negative sequence component comprises:
   generating a first d-axis negative current command according to a monitored q-axis negative voltage;
   generating a first q-axis negative current command according to a monitored d-axis negative voltage;
   regulating the first d-axis negative current command and the first q-axis negative current command to generate a d-axis negative voltage command and a q-axis negative voltage command respectively;
   rotating the d-axis negative voltage command and the q-axis negative voltage command in a positive sequence;
   transforming the rotated d-axis negative voltage command and the rotated q-axis negative voltage command in the positive sequence to the voltage command signals; and
   supplying the voltage command signals to a pulse-width modulation (PWM) modulator to trigger the PWM modulator to generate a control signal accordingly and wherein the control signal comprises a pulse signal.

19. The method of claim 18, further comprising:
   determining whether a difference between a calculated feedback negative reactive power and a specified negative reactive power command is zero;
   generating a second q-axis negative current command according to the calculated feedback negative reactive power and the specified negative reactive power command upon determination that the difference is not zero; and generating a third q-axis negative current command by summing the first q-axis negative current command and the second q-axis negative current command; and regulating the third q-axis negative current command to generate the q-axis negative voltage command.

20. A system capable of performing reactive power control, the system comprising:

a power converter, the power converter comprising a machine-side converter and a grid-side converter, the machine-side converter being electrically coupled to a power source for converting alternating current (AC) electric power to direct current (DC) electric power, the grid-side converter being electrically coupled to an electrical grid for converting the DC electric power to AC electric power; and a controller operatively coupled to the grid-side converter, the controller configured to monitor the AC electric power transmitted between the grid-side converter and the electrical grid and to decouple a first sequence component and a second sequence component from a monitored AC electric power, the controller further configured to perform a first reactive power control with respect to the first sequence component to generate a first command signal, the controller further configured to perform a second reactive power control with respect to the second sequence component to generate a second command signal, the controller further configured to transmit a control signal to the grid-side converter in response to the first command signal and the second command signal to enable the grid-side converter to adjust a reactive power of the AC electric power transmitted between the grid-side converter and the electrical grid, wherein the controller comprises:

a voltage decoupling circuit configured to decouple a positive sequence voltage component, a negative sequence voltage component, a positive phase angle and a negative phase angle from the monitored AC electric power;

a current decoupling circuit configured to decouple a positive sequence current component and a negative sequence current component from the monitored AC electric power using the positive phase angle and the negative phase angle;

a power calculating circuit configured to calculate a feedback positive reactive power according to the positive sequence voltage component and the positive sequence current component, and to calculate a feedback negative reactive power according to the negative sequence voltage component and the negative sequence current component;

a positive power regulator configured to generate a first d-axis positive current command according to a DC voltage across a DC link of the power converter and a specified DC voltage command and to generate a first q-axis positive current command according to a calculated feedback positive reactive power and a specified positive reactive power command;

a positive current regulator configured to regulate the first d-axis positive current command and the first q-axis positive current command to generate a d-axis positive voltage command and a q-axis positive voltage command, and to transform the d-axis positive voltage command and the q-axis positive voltage command to generate voltage commands; and a pulse width modulation (PWM) modulator configured to receive the generated voltage commands and to supply the control signal.

* * * * *